Figure 1:
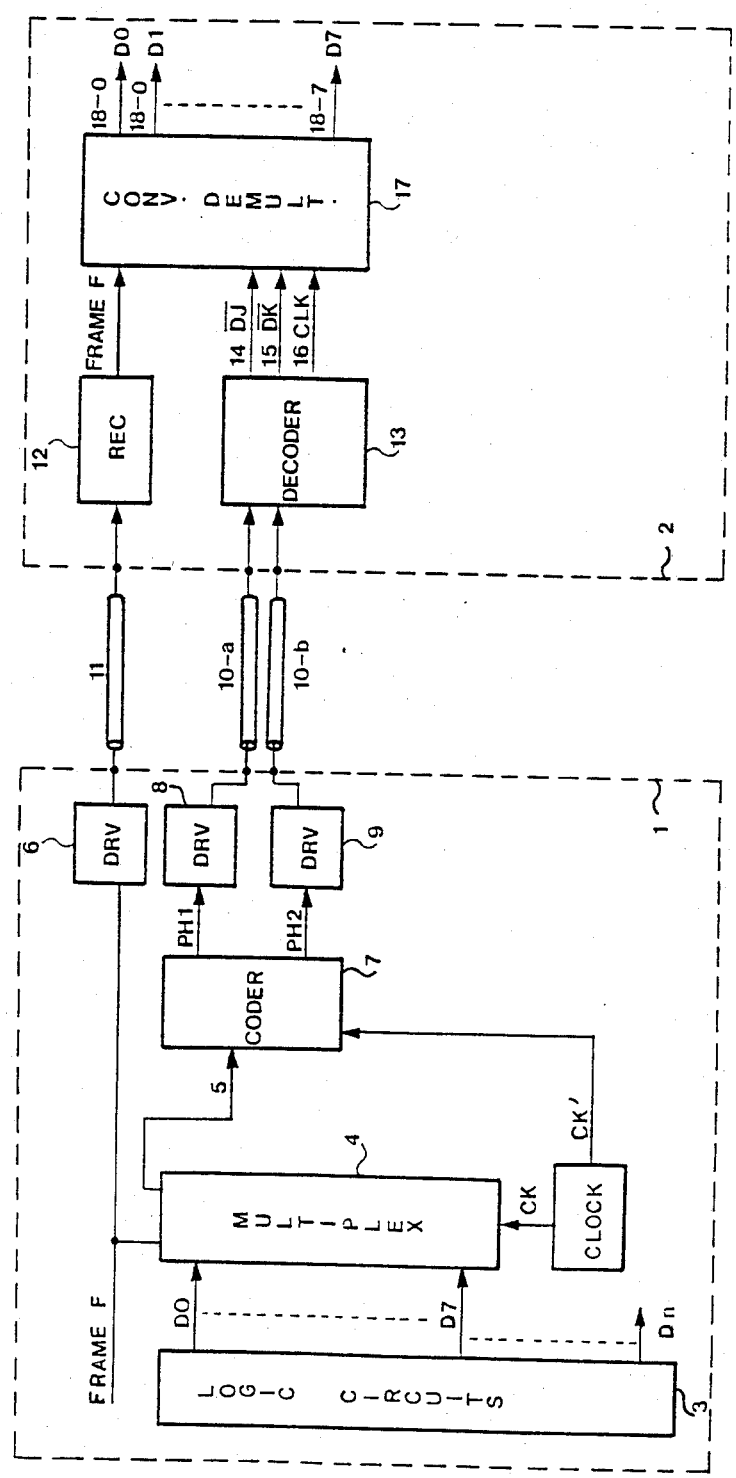

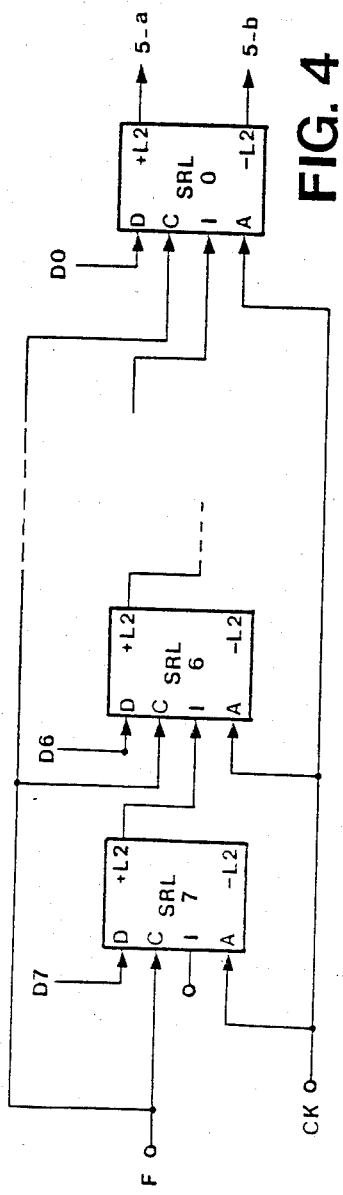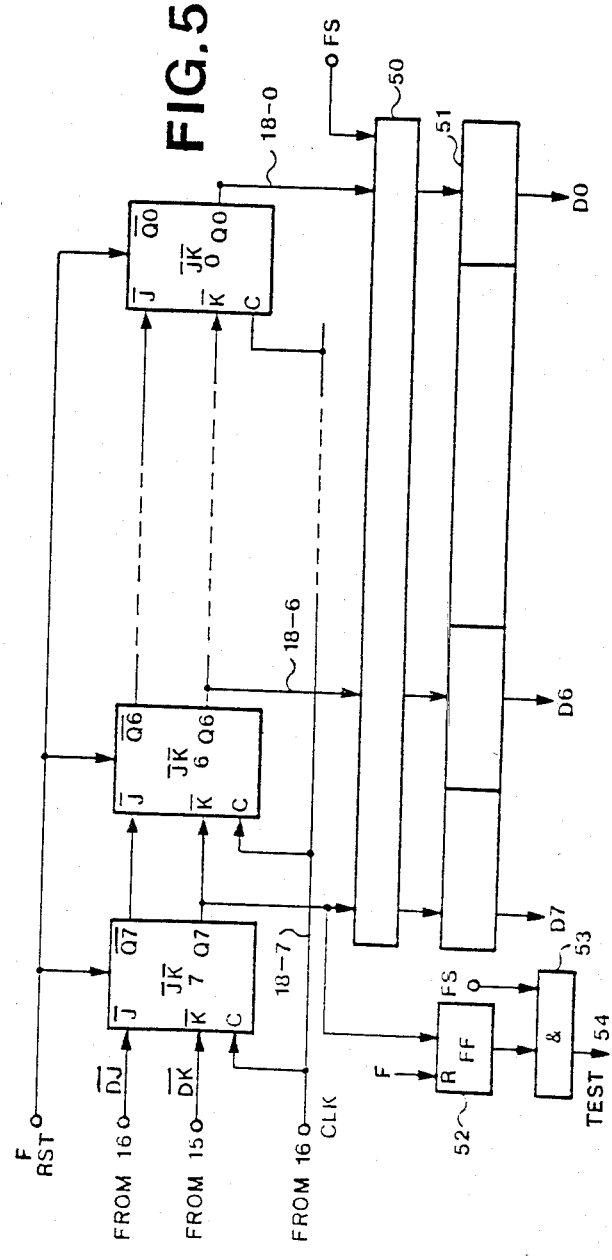

CHIP TO CHIP INFORMATION BIT TRANSMISSION PROCESS AND DEVICE

DESCRIPTION OF THE INVENTION

1. Technical Domain

This invention relates to a process and a device for high-speed transmissions of binary information from semi-conducting chips to semi-conducting chips provided with integrated circuits comprising an information processing system.

Nowadays, the transmission of information bits from chips to chips arranged on various modules, raises a problem when the man skilled in the art has to design an information processing system provided with on chips integrated circuits. In fact, it is necessary to minimize the room occupied by the chip input/output pads to be connected to the contact of the modules carrying the chips to take advantage of the increasing density of the integrated circuits carried by said chips. In such a case, the number B of the input/output pads increases as the number C of the circuits according to the following relation $B \simeq C^{\frac{2}{3}}$. The number od the drive circuits required for transmitting the information bits from one chip to another one rises in the same proportions. As these drive circuits generates electric noise on the supply voltages, it is not recommended to increase their number.

Further the number of the module input/output pins is limited, therefore the increasing number of the chip circuit input/output pads involves a sophisticated design of the module and then, an increase of the production cost thereof.

To day, to obtain a better performance of a data processing system, one has to improve both chip-to-chip transmission and the chip circuits. In fact, the specific processing time of a circuit is only equal to about one third of the average processing time for each circuit, at the system level.

In general, in the information processing systems, the chip circuits process groups of bits, i.e. bytes or words and the groups of bits obtained after processing, are transmitted in parallel to another chip where they are to be processed again.

When the chips are arranged on various modules, said modules are to be provided with a great number of input/output pins to allow said parallel transmission to be ensured.

Further, said parallel transmission involves a problem of electric noise generated by the simultaneous switching of the chip output drive circuit transistors into the conducting condition.

One solution to these problems consists in multiplexing the information bits to be transmitted from a chip provided on a module to another chip provided on another module, in order to limit the number of the chip circuit input/output pads.

It is obvious that serial transmission while saving input/output pads, also shows some drawbacks.

In effect, serial transmission can be ensured with a coding of the NRZ or NRZI type, the clock signal being retrieved at the receiving end. This type of transmission is sophisticated since it does not imply only logic circuits. In fact, clock retrieval required VCO type oscillators controlled by a voltage obtained from phase detectors. It is difficult to implement and test these circuits provided within an environment of logic integrated circuits.

To overcome this drawback it is possible to carry out a transmission with a coding of the double frequency type which allows, at the receiving end, the clock to be directly retrieved from the received signal. This type of transmission requires a greater pass-band width than the type of transmission using a NRZ or NRZI coding and therefore, with the same pass-band, the data bit transmission speed is lower.

Thus, an object of this invention is to provide a process and a device for transmitting binary signals at high speed from a transmitting chip to a receiving chip by using a minimum number of input/output pads.

Another object of this invention is to provide a device of this type using simple circuits.

SUMMARY

This invention relates to a process for transmitting information bits generated by first circuits on a first chip, to second circuits on a second chip in which the parallel data bits to be transmitted are multiplexed and converted into a serial bit train (D), with one bit per clock period. The process includes the following steps:

generating a saw-tooth clock signal CK' having an amplitude exceeding the amplitude of the bits and a period equal to two clock periods;

generating a first and a second signal PH1 and PH2 from bit train D and its complement $\overline{D}$, signal PH1 being at a first level, for instance a high level, when the level of bit train D is higher than the level of clock signal CK', and at a second level, for instance a low level, when the level of bit train D is lower than the level of clock signal CK' and the second signal PH2 being at the first level (high) when the level of train bit complement $\overline{D}$ is higher than clock signal CK' and at the second level when the level of train bit complement $\overline{D}$ is lower than the level of clock signal CK', transmitting signals PH1 and PH2 to the receiving chip, generating in said second chip, from signals PH1 and PH2, two signals $\overline{DJ}$ and $\overline{DK}$ representative of the bit status and a reconstructed clock signal CLK defining each bit period. First signal $\overline{DJ}$ is at the first level (high) when the levels of PH1 and PH2 are equal or when the level of PH1 is lower than the level of PH2, and at a second level (low) when the level of PH1 is higher than the level of PH2. Second signal $\overline{DK}$ is at a first level (high) when the levels of PH1 and PH2 are equal or when the level of PH1 is higher than the level of PH2 and at a second level (low) when the level of PH1 is lower than the level of PH2.

Reconstructed clock signal CLK is at the first level (high) when the levels of PH1 and PH2 are different and at the second level (low) when the opposite is true.

On the first chip, a frame signal F is used for assembling the bit train bits into bytes and this signal is transmitted to the second chip wherein it is used together with reconstructed clock signal CLK for converting and transforming signals $\overline{DJ}$ and $\overline{DK}$ into bytes of parallel bits.

This invention also relates to a device for executing said process.

and $\overline{K}$ of type JK latches of a register for deserializing the data bits.

Figure 3:
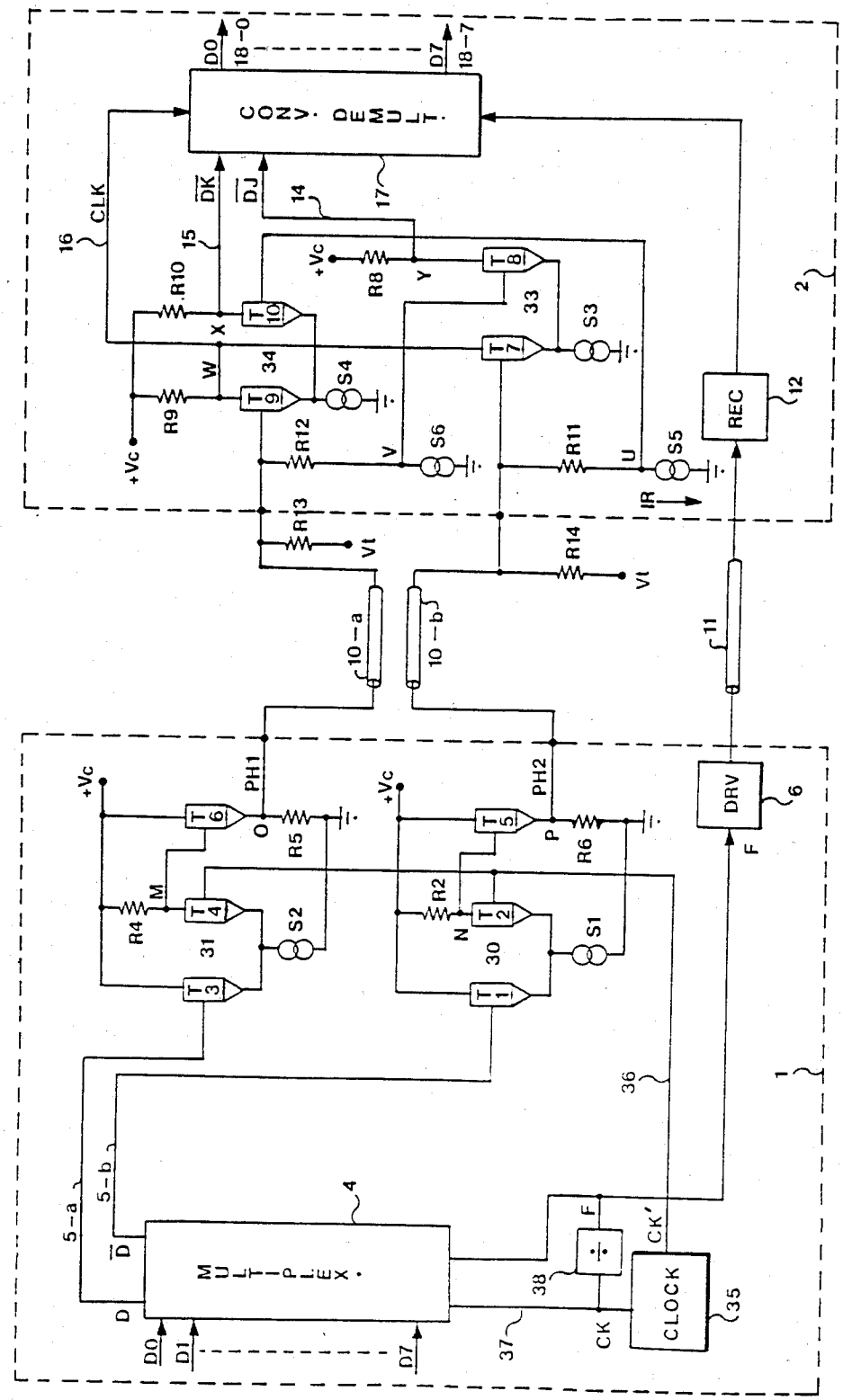

The circuits provided for implementing this process will be described in the following with reference to FIG. 3.

On chip 1, two comparators 30 and 31 generate PH1 and PH2 from serial data bit stream D and its complement $\overline{D}$ provided by multiplexing circuit 4 shown on FIG. 4.

On chip 2, signals $\overline{DJ}$, /OVs/DK/ and CLK are provided by two comparators 33 and 34 and applied to a converting and demultiplexing circuit 17 shown on FIG. 5.

On chip 1, a clock 35 provides signal CK' through its output 36 and signal CK through its output 37, said signal CK is divided by 8 by frequency divider 38 to produce frame signal F. Signals CK and F are applied to multiplexing circuit 4 for serializing bits D0 to D7.

In a preferred embodiment, each of the comparators generating signals PH1 and PH2 is comprised of two emitter coupled NPN transistors,: T1 and T2 in comparator 30, T3 and T4 in comparator 31.

The base of transistor T3 receives data bits D and the base of transistor T1 receives the complement of data bits $\overline{D}$. The base of transistors T2 and T4 receive clock signal CK' from line 36. The emitters of T1 and T2 are grounded through a current source S1 and the emitters of T3 and T4 are grounded through a current source S2. The collectors of T1 and T3 are connected to a positive supply voltage +Vc through resistors R2 and R4 respectively.

When data bits DC on the base of T3 are at a level higher than clock signal CK' on the base of T4, T3 conducts and therefore, T4 is OFF and the collector of transistor T4 (point M) is at a high level. When the opposite is true: data bit D lower than clock signal CK', T4 conducts and T3 is OFF point M is at a low level.

When the level of complement $\overline{D}$ of the data bits on the base of T1 is higher than clock signal CK' on the base of T2, T1 conducts and T2 is OFF the level of the voltage at to the collector of T2' point N) is high. Conversely, when the level of complement $\overline{D}$ of the data bits is lower than clock signal CK', T1 is OFF and T2 conducts. Therefore, point N is at a low level.

Points N and M are connected to the bases of two transistors T5 and T6 which comprise drive circuits 9 and 8 of FIG. 1. The collectors of said transistors T5 and T6 are connected to the positive supply voltage and their emitters are grounded through resistors R5 and R6. Therefore, the signals from points M and N appear in points O and P with the same difference of level and are signals PH1 and PH2 which are transmitted to receiving chip 2 through lines 10-a and 10-b.

On chip 2, two comparators 33 and 34 are provided for detecting the following three conditions PH1>PH2, PH1<PH2 and PH1=PH2.

Comparator 33 comprises two emitter coupled transistors T7 and T8 the emitters of which are grounded through a current source S3.

The base of T7 is connected to line 10-b and to a first pad of a resistor R11 second pad U of which is grounded through a IR current source, S5.

The collector of T8 is connected to supply voltage +Vc through resistor R8.

Comparator 34 includes two emitter coupled transistors T9 and T10 provided the emitter of which are grounded through a current source S4.

The base of T9 is connected to line 10-a and to a first pad of resistor R12 having the same resistance as R11, second pad V of which is grounded through IR current source, S6. The collector of T10 is connected through resistor R10 to supply voltage +Vc and the collector of T9 is connected to the collector of transistor T7, at point W and to the supply voltage through resistor R9.

The base of T8 is connected to point V and the base of T10 is connected to point U.

Signals $\overline{DK}$ and $\overline{DJ}$ are obtained from the collectors of T10 and T8, respectively, at points X and Y and signal CLK is obtained from the collectors of T7 and T9 at point W.

Resistors R13 and R14 one pad of which is connected to lines 10-a and 10-b respectively, located at the input of chip 2 and a second pad of which is connected to supply voltage VT, are provided as line adapters. Current through the resistors is limited so that T5 and T6 do not conduct too much.

The circuit operates as follows:

When PH1 is higher than PH2, the T9 base potential is higher than the T10 base one. In fact, point U potential is equal to PH2 minus R11 IR which corresponds to the circuit noise immunity. Therefore, T9 conducts and T10 is OFF point X potential is high.

In comparator 33, if PH1 is higher than PH2 plus the voltage drop in R12, T7 is OFF and T8 conducts, the potential at point Y is low.

When T9 conducts and T7 is OFF the potential at point W is high.

Conversely, when PH1 is lower than PH2, the T7 base potential is higher than the T8 base one. In fact, point W potential is equal to PH1 minus R12 IR which corresponds to the circuit noise immunity. Therefore, T7 conducts and T8 is OFF and the potential at point Y is high.

In comparator 34, T9 is OFF and T10 conducts, therefore the potential at point X is low.

When T7 conducts and T9 is OFF the potential at point W is high.

When PH1=PH2 or when the difference between these two signals is lower than the voltage drop across R11 or R12, transistors T9 and T7 conduct and T8 and T10 are OFF, therefore the potentials at points X and Y are high and the potential at point W is low.

Figure 2:
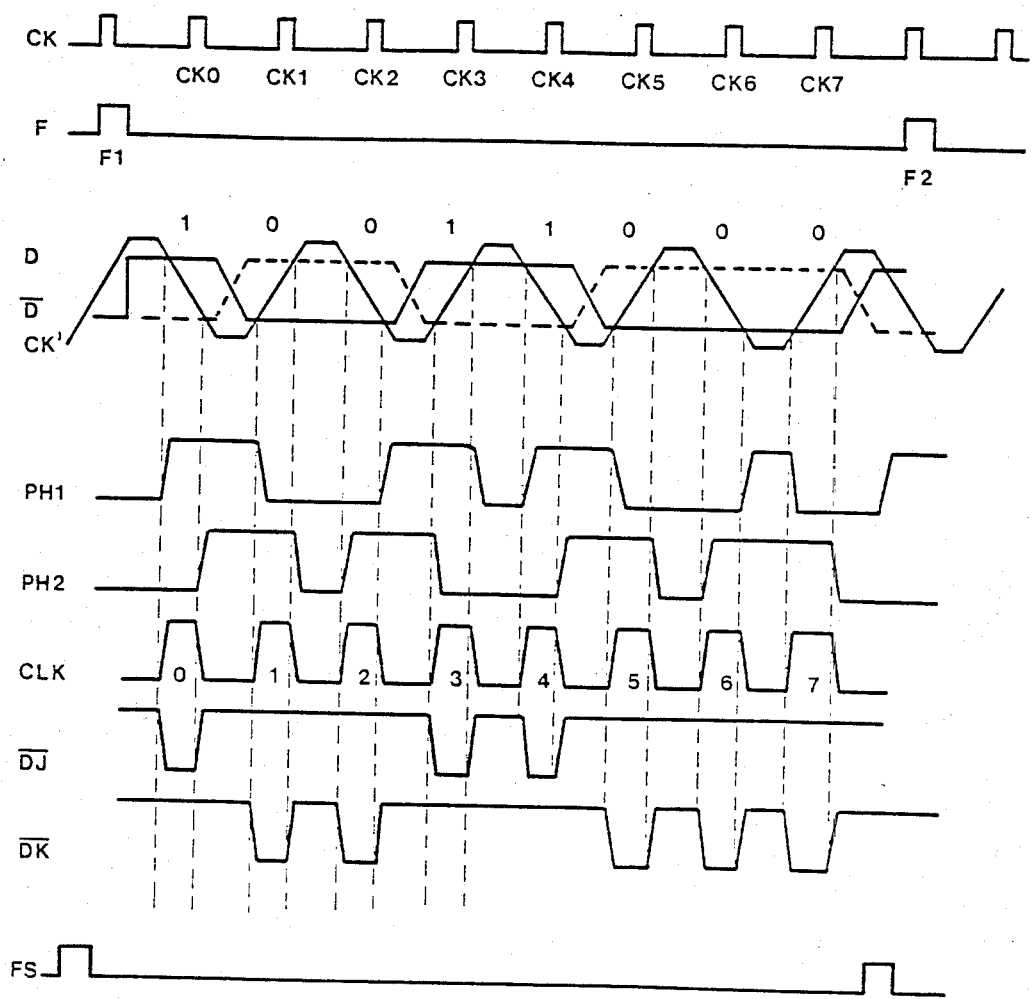

Consequently, the signals obtained from points Y, X and W are signals $\overline{DJ}$, $\overline{DK}$ and CLK of FIG. 2 and are used in circuit 17 under the control of frame signal F received by receiver 12, for providing deserialized data bits D0 to D7 which will be used by the receiving chip 2 circuits not shown on the figure.

FIG. 4 illustrates circuit 4 allowing serialized data bits D0 to D7 to be multiplexed.

This circuit is comprised of eight stages SRL0 to SRL7 of shift register latches having two data inputs and two control inputs which can receive two clock signals. These latches can be of the type described in the article entitled "Level sensitive scan desingal tests chips, boards, systems", "electronics", Mar. 15, 1979, page 108.

The reference used in this figure for the various inputs and outputs of each latch are similar to the ones used in the above cited article, namely:

D: System Data
C: System Clock
I: Scan Data
A: Shift A Clock
+L2: True output

—L2: Complementary output.

Latches SRL7 to SRL0 are arranged to provide a shift register. Output +L2 of latch SRL7 is connected to input I of latch SRL6, etc . . . .

Clock signal CK is applied to all latch inputs A and frame signal F is applied to all inputs C.

The data bits are applied to inputs D, D7 being applied to input D of latch SRL7 and D0 being applied to input D of latch SRL0.

On first frame pulse F1, the data bits are loaded in parallel into latches SRL7 to SRL0, and then, on each clock pulse CK, they are shifted in the latch set. So that on first clock pulse CK0, outputs +L2 and −L2 of latch SRL0 provide bit D0 and its complement $\overline{D0}$ through lines 5-a and 5-b, and the condition of latch SRL1 is transferred to latch SRL0. Thus, successively on each of following pulses CK1 to CK7, one bit and its complement D1, D1 to D7, D7 appear from outputs 5-a and 5-b.

On next frame pulse F2, another byte can be loaded into the register to be serialized.

FIG. 5 shows a circuit 17 allowing data bits D0 to D7 to be retrieved from signals $\overline{DJ}$, $\overline{DK}$ and CLK.

This circuit is comprised of eight serial arranged latches of the $\overline{J}$-$\overline{K}$ type: $\overline{JK7}$ $\overline{JK7}$ in which the condition of a latch is transferred to the following latch under the control of clock signal CLK obtained from point W of the circuit shown on FIG. 3.

In this type of latch, two inputs $\overline{J}$, and $\overline{K}$ and two outputs Q and $\overline{Q}$ are provided. Input $\overline{J}$ is provided to set the latch to 0 and input $\overline{K}$ to set the latch to 1 and condition Qt+1 of the latch on time t+1 depends on its condition Qt on the preceding time according to the following truth table:

| Qt | J | K | Qt + 1 |
|----|---|---|--------|
| 0  | 1 | 1 | 0      |
| 0  | 1 | 0 | 0      |
| 0  | 0 | 1 | 1      |
| 0  | 0 | 0 | 1      |
| 1  | 1 | 1 | 1      |
| 1  | 1 | 0 | 0      |
| 1  | 0 | 1 | 1      |
| 1  | 0 | 0 | 0      |

Signals $\overline{DJ}$ and $\overline{DK}$ are applied to inputs $\overline{J}$ and $\overline{K}$ of latch $\overline{JK7}$. Outputs $\overline{Q}$ and Q of latch $\overline{JK7}$ are connected to inputs $\overline{J}$ and $\overline{K}$ of following latch $\overline{JK6}$ and so on, up to latch $\overline{JK0}$.

The condition of successive latches $\overline{JK7}$ to $\overline{JK0}$ is propagated at the rate of clock signal CLK.

All the latches are reset to zero (condition Q=0, $\overline{Q}$=1) by the frame pulses.

Consequently, first received pulse frame F1 sets all the latches to 0.

On clock pulse CLK0 (FIG. 2) $\overline{DJ}$=0 and $\overline{DK}$=1, therefore Q7 goes to 1.

On clock time CLK1, Q7 being set to 1 and $\overline{Q7}$ to 0, latch $\overline{JK6}$ goes to 1, $\overline{DJ}$ is set to 1 and $\overline{DK}$ to 0, latch $\overline{JK7}$ goes to 0 ($\overline{Q7}$=1, Q7=0).

On clock pulse CLK2, Q6=1 and $\overline{Q6}$=0, Q7=1 and $\overline{Q7}$=0, latch $\overline{JK5}$ goes to 1., latch $\overline{JK6}$ goes to 0, $\overline{DJ}$ is equal to 1 and $\overline{DK}$ is equal to 0, latch $\overline{JK7}$ which was previously set to 0 remains at 0.

Thus, on each clock pulse CLK, the condition of each latch is propagated through the set of latches $\overline{JK7}$ to $\overline{JK0}$ and after eight pulses CLK0 to CLK7, output Q7 to Q0 of the various latches are at the levels representative of data bits 10011000 in the example shown on FIG. 2.

Then the condition of the latches is transferred into an output register 51 through gates 50 opened by a signal FS shown on FIG. 2, said signal FS being frame signal F advanced by an half period of clock CK.

One of the already-indicated advantages of this inventions is that it saves module I/O pins used for mounting transmitting and receiving chips. Since the serial transmissions of the data bits requires the transmission of an additional frame signal, it is possible to use the same signal transmitted by circuit 6 and received by circuit 12, for controlling the multiplexing and demultiplexing of several data bytes to be transmitted from 1 to 2.

In addition to this advantage, the process and device of this invention allow data to be transmitted with small signal swings since a differential transmission mode is used. In fact, only the difference of levels between PH1 and PH2 is significant. For this reason, the transmission can be performed with small voltage swings on two coupled lines which can be printed circuit lines with a minimum spacing. Due to this coupling, the system can bear a noise/signal ratio higher than the one of the conventional systems.

It is also possible to match the resistor at the end of the lines (R13,R14 on FIG. 3) with the line impedance, which provides a better trade-off between the power and performance characteristics.

Both transmission means 10-a and 10-b could also be comprised of optical fibers. In this case, the adapters required for driving said optical fibers should be provided on chips 1 and 2.

Another advantage of this system is that it makes detecting parity errors easier at the receiving end. To ensure this function, it is sufficient to provide the circuit of FIG. 5 with a latch 52 the condition of which is controlled by output Q7. This latch is reset by the frame signal and its condition changes on each rising transition of the signal issued from output Q7. Therefore, at the end of a byte transmission, said latch is always in a determined condition if said transmission has not introduced any parity error, said condition depending on the convention in use namely an number of 1 or an odd number of 1. The condition of latch 52 is tested at the end of a byte transmission. For this purpose, signal FS and the output signal of latch 52 are applied to an AND gate 53, output 54 of which is tested.

The condition of the output signal of AND gate 53 will indicate whether there have been parity errors or not in the transmission.

While there has been described what are at present considered to be a preferred embodiment of this invention, it will be obvious to those skilled in the art that various changes and modifications may be made therein without departing from the invention, and it is, therefore intended to cover all such changes and modifications as fall within the true spirit and scope of the invention.

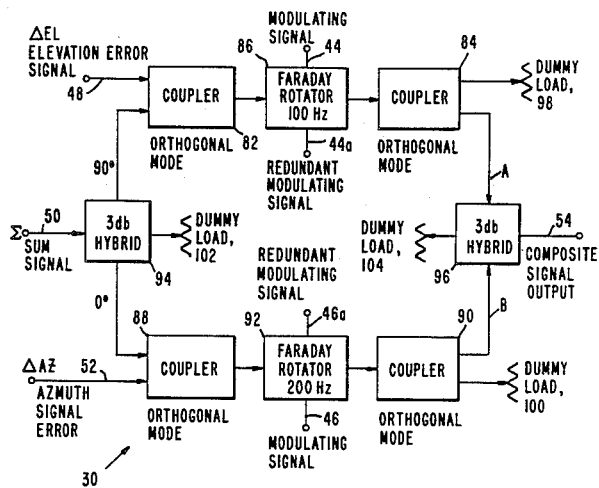

We claim:

1. A process for transmitting information bits generated by first circuits on a first chip to second circuits on a second chip, in which the bits to be transmitted belong to a serialized bit stream, one bit per clock periods, characterized in that it includes the following steps:

generating in the first chip a saw-tooth signal (CK') having an amplitude higher than the amplitude of the bits to be transmitted and a period of two clock periods, generating in the first chip a first and a second signal PH1 and PH2 from the bit stream ($\overline{D}$) and its complement (D), said first signal being at a first level when the bit stream level is higher than the saw-tooth clock signal level and being at a second level when the bit stream level is lower than the saw-tooth clock signal level, and the second signal being at the first level when the bit stream complement level is higher than the saw-tooth clock signal and being at the second level when the bit stream complement level is lower than the saw-tooth clock signal level, transmitting the first and second signals to the second chip, and generating in said second chip from the first and second received signals, a first and a second signal ($\overline{DJ}$ and $\overline{DK}$) representative of the bit condition and a recovered clock signal (CLK) defining each bit period.

2. A process according to claim 1, characterized in that:

the first signal representative of the bit condition ($\overline{DJ}$) is at a first level when the levels of the first and second received signals (PH1 and PH2) are equal or when the level of the first received signal is lower than the level of the second received signal, and is at a second level when the level of the first received signal is higher than the level of the second received signal, the second signal representative of the bit condition ($\overline{DK}$) is at a first level when the levels of the first and second received signals (PH1 and PH2) are equal or when the level of the first received signal is higher than the level of the second received signal, and at a second level when the level of the first received signal is lower than the level of the second received signal, recovered clock signal (CLK) is at the first level when the levels of the first and second received signals (PH1 and PH2) are different, and at the second level when the levels of said first and second received signals, are equal.

3. A process as set forth in claim 1 or 2 in which the serial bit stream to be transmitted from the first chip is obtained by multiplexing bytes of parallel bits, characterized in that it comprises the following steps:

generating a frame signal (F) on the first chip for controlling the parallel bit multiplexing on said first chip, transmitting the frame signal to the second chip, converting and transforming both data representative signals ($\overline{DJ}$ and $\overline{DK}$) generated in said second chip, under control of the frame signal received by said second chip and of the recovered clock signal (CLK), into bytes of parallel bits, to be used by the second circuits in said second chip.

4. A device for implementing the process of claim 2 characterized in that it includes: means (35, 36) for providing a saw-tooth clock signal (CK') having an amplitude higher than the amplitude of the bits to be transmitted and a period of two clocks periods, a first comparing means (31) receiving the bit stream (D) and the saw-tooth clock signal (CK') as inputs and providing the first signal (PH1) as an output, a second comparing means (30) receiving the bit stream complement ($\overline{D}$) and the saw-tooth clock signal (CK') as inputs and providing the second signal (PH2) as an output, means (10-a and 19-b) for transmitting the first and second signals to the second chip, a third comparing means (33) located on the second chip, receiving a fraction of the first signal (PH1) and the second signal (PH2) as inputs and providing the first signal ($\overline{DJ}$) representative of the data condition as an output (14), a fourth comparing means (34) located on the second chip, receiving a fraction of the second signal (PH2) and the first signal as inputs and providing the second signal ($\overline{DK}$) representative of the data condition as an output (15), a fifth comparing means (T9, T7, R9) receiving the first and second signals (PH1 and PH2) and providing the recovered clock signal (CLK) as on output (16).

5. A device according to claim 4 characterized in that each of said first and second comparing means, includes a first transistor (T1 and T3) the base of which is one of the inputs of said comparing means, a second transistor (T2 and T4) the base of which is the second input of said comparing means, both transistors having their emitters connected to a first reference voltage (ground) through a current source and their collectors connected to a second reference voltage (Vp) through resistors (R2 or R4), the output of said comparing means being taken from the collector of the second transistor.

6. A device according to claim 5, characterized in that the first and second comparing means include a line drive circuit comprised of a third transistor (T5 or T6) the base of which is connected to the collector of the second reference voltage and the emitter is connected to the first reference voltage through a resistor (R5 or R6), the output of said comparing means being taken from the emitters of said third transistors (T5 or T6).

7. A device according to claim 6 characterized in that:

the third comparing means includes:

a first transistor (T7) the base of which receives the second signal (PH2) from the transmitting means and the emitter of which is connected to the first reference voltage through a first current source (S3) and the collector is connected to the second reference voltage through a first resistor (R9), a second transistor (T8) the base of which receives a fraction of the first signal (PH1) generated by a second resistor (R12) having a terminal receiving the first signal (PH1) and a second terminal connected to the first reference voltage through a second current source (S6) the emitter of which is connected to the emitter of the first transistor and the collector of which is connected to the second reference voltage through a third resistor (R8), the first signal ($\overline{DJ}$) indicative of the data condition being obtained from collector (Y) of second transistor (T8), and the fourth comparing means includes:

a first transistor (T9) the base of which receives the first signal (PH1) from the transmission means and the emitter of which is connected to the first reference voltage through a first current source (S4) and the collector of which is connected to the second reference voltage through the first resistor of the first comparing means, a second transistor (T10) the base of which receives a fraction of the second signal (PH2) generated by a first resistor (R11), having a terminal receiving the second signal (PH2) and another terminal connected to the first reference voltage through a second current source (S5), the emitter of which is connected to the emitter of the first transistor (T9) and the collector of which is connected to the second reference voltage through a second resistor (R8), the second signal ($\overline{DK}$) representative of the data condition being obtained from collector (X) of second transistor (T10), and the fifth comparing means includes:

first transistors (T7 and T9) of the third and fourth comparing means, the recovered clock signal being obtained from common point (V) of the collectors of said transistors.

8. A device according to claim 4, characterized in that it includes a converting and demultiplexing circuit (17) which comprises a set of latches ($\overline{JK}$7 to $\overline{JK}$7) of the ($\overline{JK}$) type, each one having an input ($\overline{J}$), and input ($\overline{K}$) and a clock input (C) and a true output (Q) and a complementary output ($\overline{Q}$), the set being assembled by connecting output ($\overline{Q}$) and (Q) of a latch to inputs ($\overline{J}$) and ($\overline{K}$) of the next latch and by applying signals ($\overline{DJ}$ and $\overline{DK}$) representative of the data condition to inputs ($\overline{J}$) and ($\overline{K}$) of the first latch and reconstructed clock signal (CLK) to the clock input, the data bits received by the second chip and their complements being generated through the latch outputs (Q and $\overline{Q}$), to be used by the second circuits of the second chip.

* * * * *

United States Patent [19]

Hudspeth et al.

[11] Patent Number: 4,539,681
[45] Date of Patent: Sep. 3, 1985

[54] FERRITE MODULATOR ASSEMBLY FOR BEACON TRACKING SYSTEM

[75] Inventors: Thomas Hudspeth, Malibu; Harold A. Rosen, Santa Monica; Fritz Steinberg, Culver City, all of Calif.

[73] Assignee: Hughes Aircraft Company, El Segundo, Calif.

[21] Appl. No.: 469,870

[22] Filed: Feb. 25, 1983

[51] Int. Cl.³ .................................................. H04J 15/00
[52] U.S. Cl. ...................................... 370/119; 333/122
[58] Field of Search .................. 370/119, 19, 11, 69.1, 370/118; 333/108, 122

[56] References Cited

U.S. PATENT DOCUMENTS

| | | | |
|---|---|---|---|
| 3,368,861 | 2/1968 | Rubinstein et al. | 455/616 |
| 3,956,699 | 5/1976 | Leahy | 370/19 |
| 4,385,378 | 5/1983 | Kreutel | 370/19 |

Primary Examiner—Douglas W. Olms
Attorney, Agent, or Firm—William J. Benman, Jr.; Anthony W. Karambelas

[57] ABSTRACT

A modulator system for converting a three-channel input microwave signal to a single-channel output microwave signal is formed of two microwave sections which are joined together at both their inputs and their outputs by hybrid circuits, one of which serves as a power divider and the other which serves as a power combiner. Each of the microwave sections includes a pair of couplers which are joined by a Faraday rotator. First and second microwave input signals are applied to a first port of an input coupler in each of these sections. A third microwave signal is connected by the hybrid divider to a second input port in the input couplers of each of the microwave sections. Polarization of the third signal is vertical and is maintained through the two sections. Polarization of the first and second signals is horizontal and is maintained through the two sections. With activation of the rotator, a shift in polarization occurs resulting in appearance of the signals in both the horizontal and vertical components of an output coupler in each of the sections. The vertical component of the output couplers in each of the sections is combined by the hybrid combiner to produce the single-channel microwave signal. Synchronous detectors are utilized for subsequent extraction of the first and second input signals, the synchronous detectors and the Faraday rotators being driven by common sources of modulation signals wherein the rotator in one section in modulated at a rate different from the rotator in the second section.

15 Claims, 5 Drawing Figures